United States Patent
Shin et al.

(10) Patent No.: US 8,144,796 B2
(45) Date of Patent: Mar. 27, 2012

(54) APPARATUS AND METHOD FOR SELECTING OPERATION MODE IN MIMO COMMUNICATION SYSTEM

(75) Inventors: Kil-Ho Shin, Suwon-si (KR); Soo-Bok Yeo, Suwon-si (KR); Bong-Gee Song, Seongnam-si (KR); Jong-Han Lim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 691 days.

(21) Appl. No.: 12/248,282

(22) Filed: Oct. 9, 2008

(65) Prior Publication Data
US 2009/0097583 A1    Apr. 16, 2009

(30) Foreign Application Priority Data
Oct. 10, 2007  (KR) .................. 10-2007-0101819

(51) Int. Cl.
*H04B 7/02* (2006.01)
(52) U.S. Cl. ....................................... 375/267
(58) Field of Classification Search .......... 375/227, 375/267, 316, 340, 342, 346, 358; 455/68–69
See application file for complete search history.

(56) References Cited

U.S. PATENT DOCUMENTS

| | | | | |
|---|---|---|---|---|
| 7,933,195 | B2* | 4/2011 | Kim et al. | 370/204 |
| 2005/0174981 | A1* | 8/2005 | Heath et al. | 370/342 |
| 2005/0289256 | A1* | 12/2005 | Cudak et al. | 710/62 |
| 2008/0004032 | A1* | 1/2008 | Lironi et al. | 455/452.2 |

FOREIGN PATENT DOCUMENTS

| | | |
|---|---|---|
| KR | 10-0668662 B1 | 1/2007 |
| KR | 10-2007-0061934 A | 6/2007 |
| KR | 10-2007-0070376 A | 7/2007 |
| KR | 10-2009-0024164 A | 3/2009 |

* cited by examiner

*Primary Examiner* — Khanh C Tran
(74) *Attorney, Agent, or Firm* — Jefferson IP Law, LLP

(57) ABSTRACT

An apparatus and a method for selecting an operation mode to improve a throughput in a mobile communication system are provided. The apparatus includes a Carrier to Interference and Noise Ratio (CINR) predictor for predicting a probable average and dispersion for a CINR measured using a preamble of a received pilot signal or radio signal, a metric calculator for calculating a throughput for each Modulation and Coding Scheme Level (MCS_Level) by using the probable average and dispersion for the predicted CINR and for selecting an MCS_Level having a maximum throughput, and an operation mode selector for selecting an operation mode of the selected MCS_Level having the maximum throughput.

13 Claims, 4 Drawing Sheets

APPARATUS AND METHOD FOR SELECTING OPERATION MODE IN MIMO COMMUNICATION SYSTEM

PRIORITY

This application claims the benefit under 35 U.S.C. §119(a) of a Korean patent application filed in the Korean Intellectual Property Office on Oct. 10, 2007 and assigned Serial No. 2007-101819, the entire disclosure of which is hereby incorporated by reference.

BACKGROUND OF THE INVENTION

1. Field of the Invention

The present invention relates to a Multiple Input Multiple Output (MIMO) communication system. More particularly, the present invention relates to a MIMO communication system for selecting an operation mode having a maximum throughput by using a standard deviation and an average of an instantaneous Carrier to Interference and Noise Ratio (CINR).

2. Description of the Related Art

Currently, as demand for wireless communication technologies for providing various multimedia communications is increasing, research and development in high-speed data transmission technologies is actively being pursued. A 3rd Generation (3G) wireless communication system employs a Code Division Multiple Access (CDMA) transmission scheme which has a limit in the processing of large-sized radio data. Therefore, a multi-carrier based Orthogonal Frequency Division Multiplexing Access (OFDMA) transmission scheme is considered as a transmission scheme for a next generation wireless communication system.

According to a basic concept of the OFDMA transmission scheme, serial input data streams are converted into N parallel data streams and then are carried and transmitted onto independent subcarriers in order to increase a data rate. In the OFDMA transmission scheme, the subcarriers have orthogonality and thus the respective subcarriers may overlap on a spectrum. In addition, a receiver can separate the subcarriers by using a simple signal processing scheme. As a result, an interval between transmitted symbols is longer than a case of sequentially transmitting data by using one carrier. Therefore, influence of a delay time and impulse noise of a channel is reduced. Further, interference between consecutive symbols can be reduced, thereby increasing resistance to a multi-path channel. Furthermore, a complexity of channel equalization may be reduced, and spectral efficiency may be improved in comparison with a conventional frequency division scheme.

Increasing of a transmission bandwidth is not sufficient to satisfy a data transfer rate desired by a next generation wireless communication system. There may be several methods for increasing the data transfer rate in an assigned bandwidth. At present, a method using multiple antennas is known as a most effective method.

A Multiple Input Multiple Output (MIMO) scheme may increase a transfer rate by using the multiple antennas. However, for certain reasons, it is difficult to apply the MIMO scheme to broadband transmission. To apply the MIMO scheme to broadband communication, characteristics of the OFDMA transmission scheme may be used. Therefore, active research on combining the MIMO scheme and the OFDMA transmission scheme is being conducted at present, and a new method is being proposed.

The MIMO scheme may be used to improve reception reliability for an assigned data rate or to increase a data rate for an assigned reliability. In other words, in a poor channel condition, a diversity gain can be obtained by transmitting the same data through multiple paths. In a good channel condition, the diversity gain can be obtained by transmitting individual data streams in parallel through different spatial channels.

Most research activities currently conducted in association with the MIMO scheme focus on a transmission method of obtaining a maximum diversity gain or a maximum spatial multiplexing gain. A method for switching between a diversity mode and a multiplexing mode according to a channel change is also proposed.

A link adaptive algorithm, which is a transmission mode switching technique, is designed to maximize spectral efficiency by switching between a Transmission Diversity (TD) mode and a Spatial Multiplexing (SM) mode based on a Signal to Noise Ratio (SNR) and a time/space indicator.

In the transmission mode switching technique, a MIMO operation mode (i.e., MIMO mode) is selected after a relative condition number and an average Carrier to Interference and Noise Ratio (CINR) measured by a receiver (i.e., a mobile terminal) are fed back to a base station so as to be compared with a Look-Up-Table (LUT).

However, when the average CINR is not correctly measured by the mobile terminal in a method of selecting the operation mode by using the average CINR measured by the mobile terminal, there is a problem in that the operation mode cannot be correctly selected.

Therefore, a need exists for an apparatus and method for selecting an operation mode having a maximum throughput by using a standard deviation and an average of an instantaneous Carrier to Interference and Noise Ratio (CINR).

SUMMARY OF THE INVENTION

An aspect of the present invention is to address at least the above-mentioned problems and/or disadvantages and to provide at least the advantages described below. Accordingly, an aspect of the present invention is to provide an apparatus and method for selecting an operation mode to improve a throughput of a mobile communication system.

Another aspect of the present invention is to provide an apparatus and method for selecting an operation mode by using a standard deviation and an average of an instantaneous signal in a mobile communication system.

In accordance with an aspect of the present invention, an apparatus for selecting an operation mode to improve a throughput in a receiver is provided. The apparatus includes a Carrier to Interference and Noise Ratio (CINR) predictor for predicting a probable average and dispersion for a CINR measured using a preamble of a received pilot signal or radio signal, a metric calculator for calculating a throughput for each Modulation and Coding Scheme Level (MCS_Level) by using the probable average and dispersion for the predicted CINR and for selecting an MCS level having a maximum throughput, and an operation mode selector for selecting an operation mode of the selected MCS level having the maximum throughput.

In accordance with another aspect of the present invention, a method of selecting an operation mode to improve a throughput in a receiver of a mobile communication system is provided. The method includes predicting a probable average and dispersion for an instantaneous CINR measured using a preamble of a received pilot signal or radio signal, calculating a throughput for each MCS_Level by using the probable average and dispersion for the predicted CINR and selecting an MCS level having a maximum throughput, and transmitting to a transmitter an operation mode of the selected MCS level having the maximum throughput.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

It is to be understood that the singular forms "a," "an," and "the" include plural referents unless the context clearly dictates otherwise. Thus, for example, reference to "a component surface" includes reference to one or more of such surfaces.

Hereinafter, an apparatus and method for selecting an operation mode to improve a throughput in a mobile communication system will be described.

Figure 1:
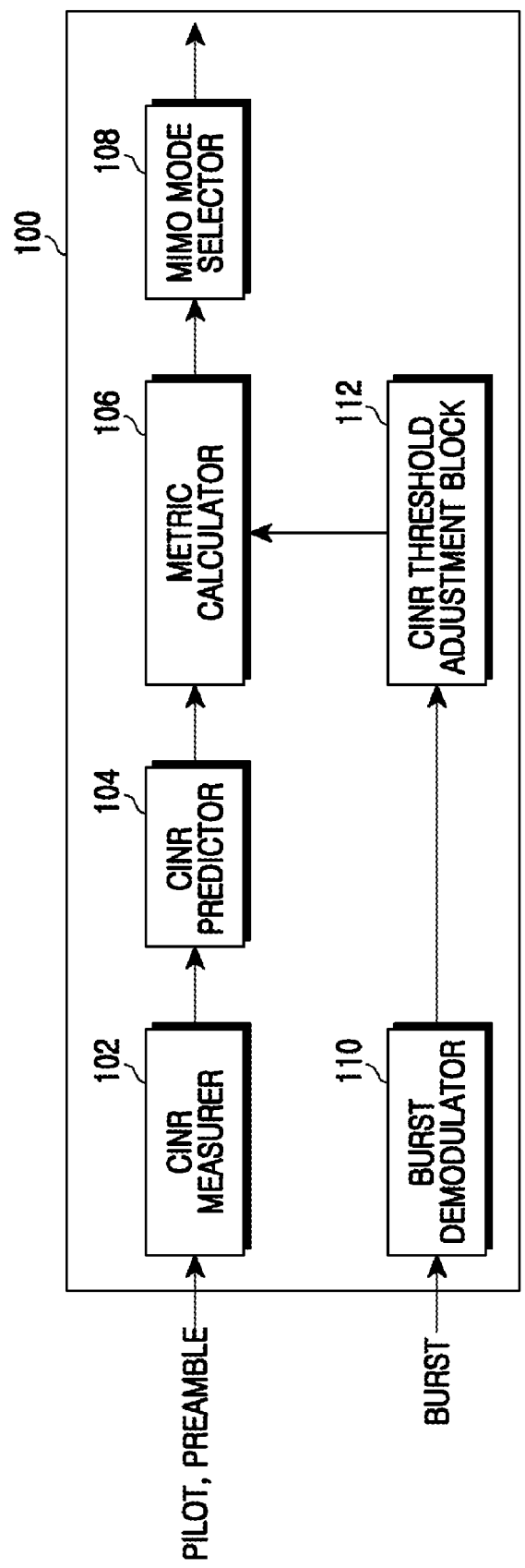
FIG. 1 is a block diagram illustrating a structure of a receiver for determining an operation mode of a mobile communication system according to an exemplary embodiment of the present invention.

FIG. 1 is a block diagram illustrating a structure of a receiver for determining an operation mode of a mobile communication system according to an exemplary embodiment of the present invention.

Referring to FIG. 1, a receiver 100 includes a Carrier to Interference and Noise Ratio (CINR) measurer 102, a CINR predictor 104, a metric calculator 106, a Multiple Input Multiple Output (MIMO) mode selector 108, a burst demodulator 110, and a CINR threshold adjustment block 112.

The CINR measurer 102 of the receiver 100 measures an instantaneous CINR by using a preamble of a radio signal or a pilot signal received from a transmitter through a radio channel. The CINR predictor 104 predicts a probable average and dispersion for the instantaneous CINR measured by the CINR measurer 102. More specifically, the receiver 100 converts a downlink CINR in a dB unit wherein the downlink CINR is measured by the CINR measurer 102 for each frame. Then, the receiver 100 provides the converted CINR to the CINR predictor 104. The CINR predictor 104 predicts the probable average and dispersion for the instantaneous CINR and provides the prediction result to the metric calculator 106. An exemplary method of predicting the probable average and dispersion for the CINR will be described below.

The receiver 100 calculates an error value which is a difference between the predicted CINR output from the CINR predictor 104 and the instantaneous CINR measured for each frame. Then, the receiver 100 obtains an error size by providing the calculated error value to a square operator. Thereafter, the receiver 100 selects an instantaneous CINR having a smallest error size as an average value of the instantaneous CINR.

The metric calculator 106 calculates a throughput for each Modulation and Coding Scheme Level (MCS_Level) by using the probable average and dispersion for the CINR predicted by the CINR predictor 104. Then, the metric calculator 106 selects an MCS level having a maximum throughput for each operation mode (i.e., Space-Time Coding (STC) and Spatial Multiplexing (SM)).

The metric calculator 106 may calculate the throughput for each MCS_Level by using Equation (1) below.

$$P_{th} = p \times b \times (c+1) \qquad \text{Equation (1)}$$

In Equation (1), $P_{th}$ denotes the predicted throughput, and p denotes a probability value for the instantaneous CINR, where $p = P(r >= r_{threshold})$. The variable b denotes a per-slot transmission amount (byte) of each MCS_Level, c denotes an operation mode of a MIMO mode, r denotes the instantaneous CINR, and $r_{threshold}$ denotes a threshold required to calculate a throughput.

When operating at the MCS_Level of the maximum throughput by the metric calculator 106, the MIMO mode selector 108 selects an operation mode (i.e., MIMO mode) having a maximum throughput and transmits the selected operation mode to the transmitter. The operation mode may be one of a Transmission Diversity (TM) mode and a Spatial Multiplexing (SM) mode.

The CINR threshold adjustment block 112 adjusts a threshold required to calculate the throughput by using a Cyclic Redundancy Check (CRC) result of the burst demodulator 110. More specifically, when an initial threshold is determined, the CINR threshold adjustment block 112 determines the threshold as a CINR that satisfies a target Packet Error Rate (PER) in a short-term PER curve for Hybrid Automatic Repeat reQuest (HARQ) burst transmission. By using the CRC result of the burst demodulator 110, if many errors are detected so that the CRC cannot satisfy the target PER, the determined initial CINR threshold is increased by adding an offset. Otherwise, the determined initial CINR threshold is decreased by the offset. In such an adaptive process, an outer loop is formed as a result.

Figure 2:
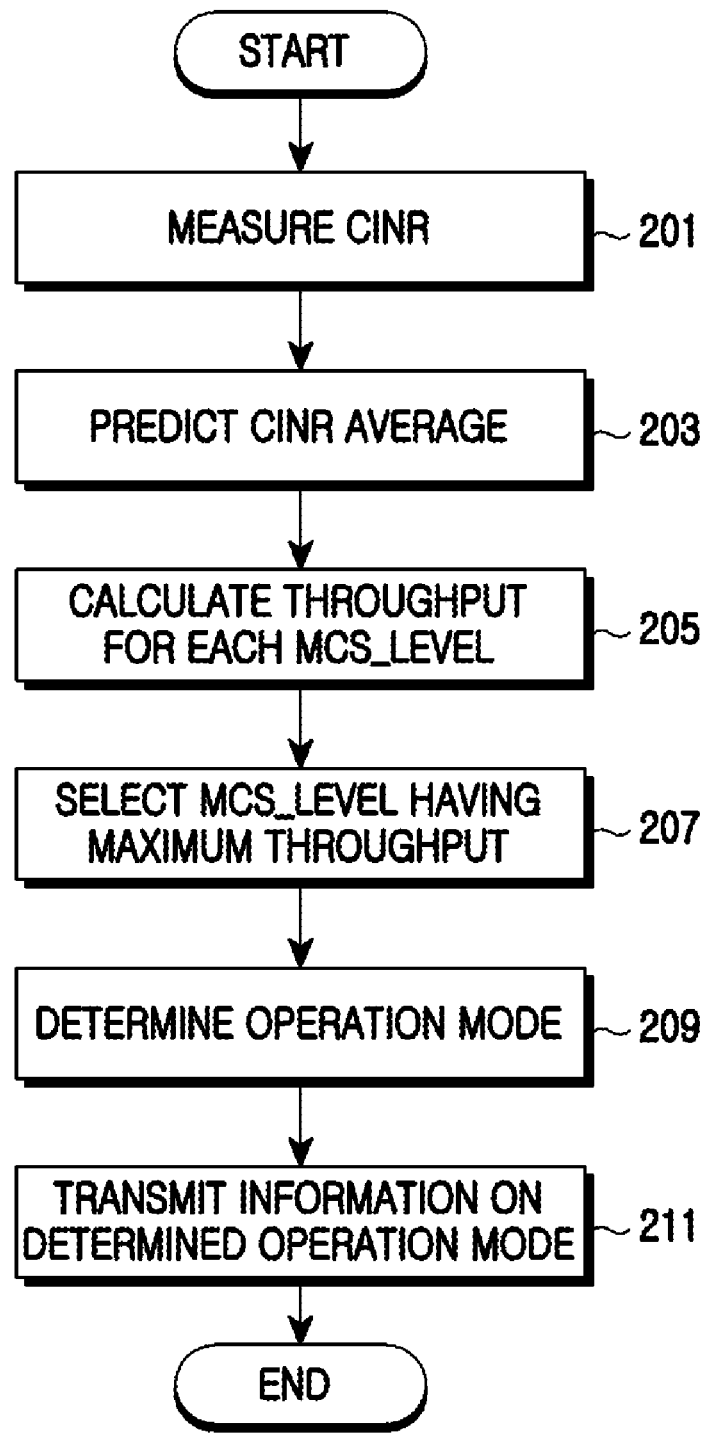
FIG. 2 is a flowchart illustrating a process of selecting an operation mode to improve a throughput in a receiver according to an exemplary embodiment of the present invention.

FIG. 2 is a flowchart illustrating a process of selecting an operation mode to improve a throughput in a receiver according to an exemplary embodiment of the present invention.

Referring to FIG. 2, the receiver 100 measures an instantaneous CINR by using a preamble of a radio signal or a pilot signal received from a transmitter through a radio channel in step 201. Then, the receiver 100 predicts a probable average and dispersion for the instantaneous CINR in step 203.

More specifically, the receiver 100 converts a downlink CINR in a dB unit wherein the downlink CINR is measured for each frame. Then, the receiver 100 predicts the probable average and dispersion for the instantaneous CINR, and obtains an error size by calculating an error value which is a difference between the predicted CINR and the instantaneous CINR measured for each frame. Thereafter, the receiver 100 selects an instantaneous CINR having a smallest error size as an average value of the instantaneous CINR. An exemplary process of predicting the probable average and dispersion for the instantaneous CINR will be described in greater detail with reference to FIG. 3.

In step 205, the receiver 100 allows the metric calculator 106 to calculate a throughput for each MCS_Level by using the probable average and dispersion for the predicted CINR. In step 207, the receiver 100 allows the metric calculator 106 to select an MCS level having a maximum throughput for each operation mode (i.e., STC and SM).

The metric calculator 106 may calculate the throughput for each MCS_Level by using Equation (2) below.

$$P_{th} = p \times b \times (c+1) \qquad \text{Equation (2)}$$

In Equation (2), $P_{th}$ denotes the predicted throughput, and p denotes a probability value for the instantaneous CINR, where $p = P(r >= r_{threshold})$. The variable b denotes a per-slot transmission amount (byte) of each MCS_Level, c denotes an operation mode of a MIMO mode, r denotes the instantaneous CINR, and $r_{threshold}$ denotes a threshold required to calculate a throughput.

In step 209, when operating at the MCS_Level of the maximum throughput, the receiver 100 selects an operation mode (i.e., MIMO mode) having a maximum throughput. In step 211, the receiver 100 transmits the selected operation mode to the transmitter.

Thereafter, the procedure of FIG. 2 ends.

Figure 3:
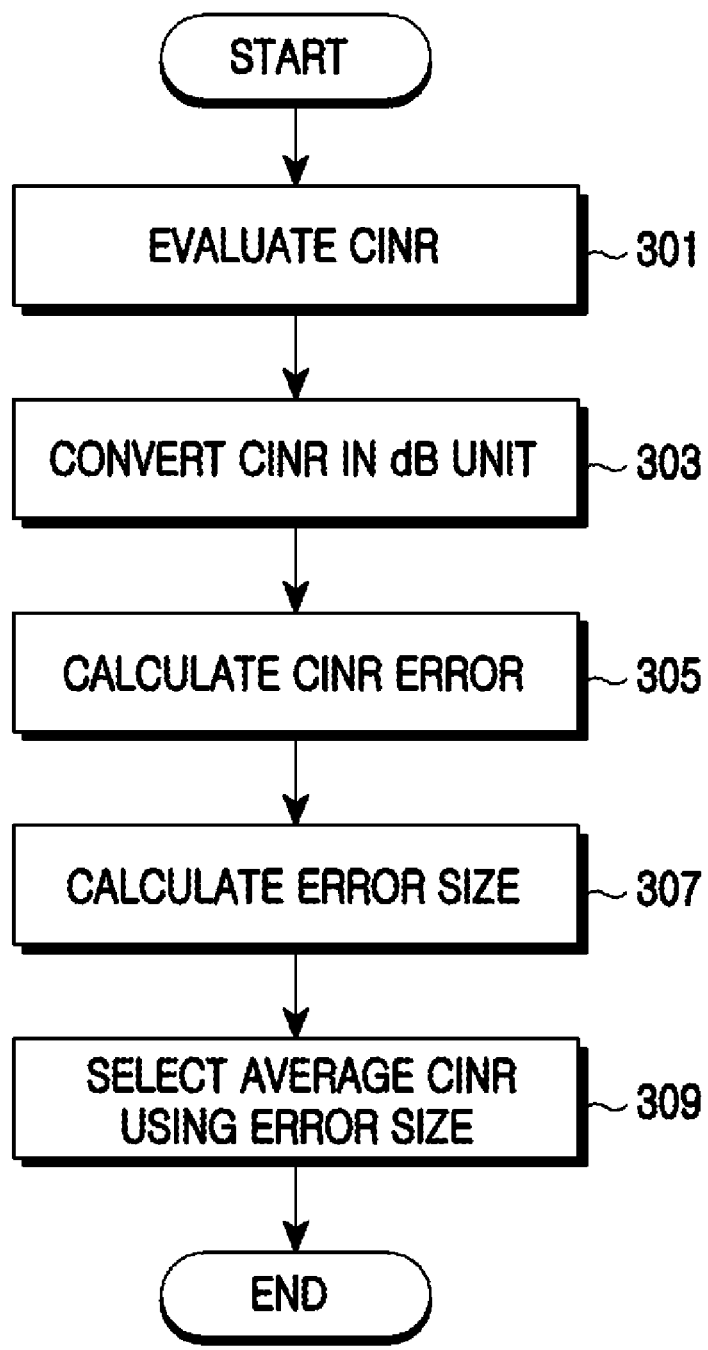
FIG. 3 is a flowchart illustrating a process of predicting a probable average and dispersion for an instantaneous Carrier to Interference and Noise Ratio (CINR) in a receiver according to an exemplary embodiment of the present invention.

FIG. 3 is a flowchart illustrating a process of predicting a probable average and dispersion for an instantaneous CINR in a receiver according to an exemplary embodiment of the present invention.

Referring to FIG. 3, the receiver 100 evaluates the instantaneous CINR in step 301. The CINR can be evaluated using a preamble of a radio signal or a pilot signal received from a transmitter through a radio channel.

In step 303, the receiver 100 predicts the probable average and dispersion for the instantaneous CINR by converting a downlink CINR in a dB unit wherein the downlink CINR is measured for each frame. In step 305, the receiver 100 calculates an error value which is a difference between the predicted CINR and the instantaneous CINR measured for each frame.

In step 307, the receiver 100 obtains an error size. In step 309, the receiver 100 selects an instantaneous CINR having a smallest error size as an average value of the instantaneous CINR.

Thereafter, the procedure of FIG. 3 ends.

Figure 4:
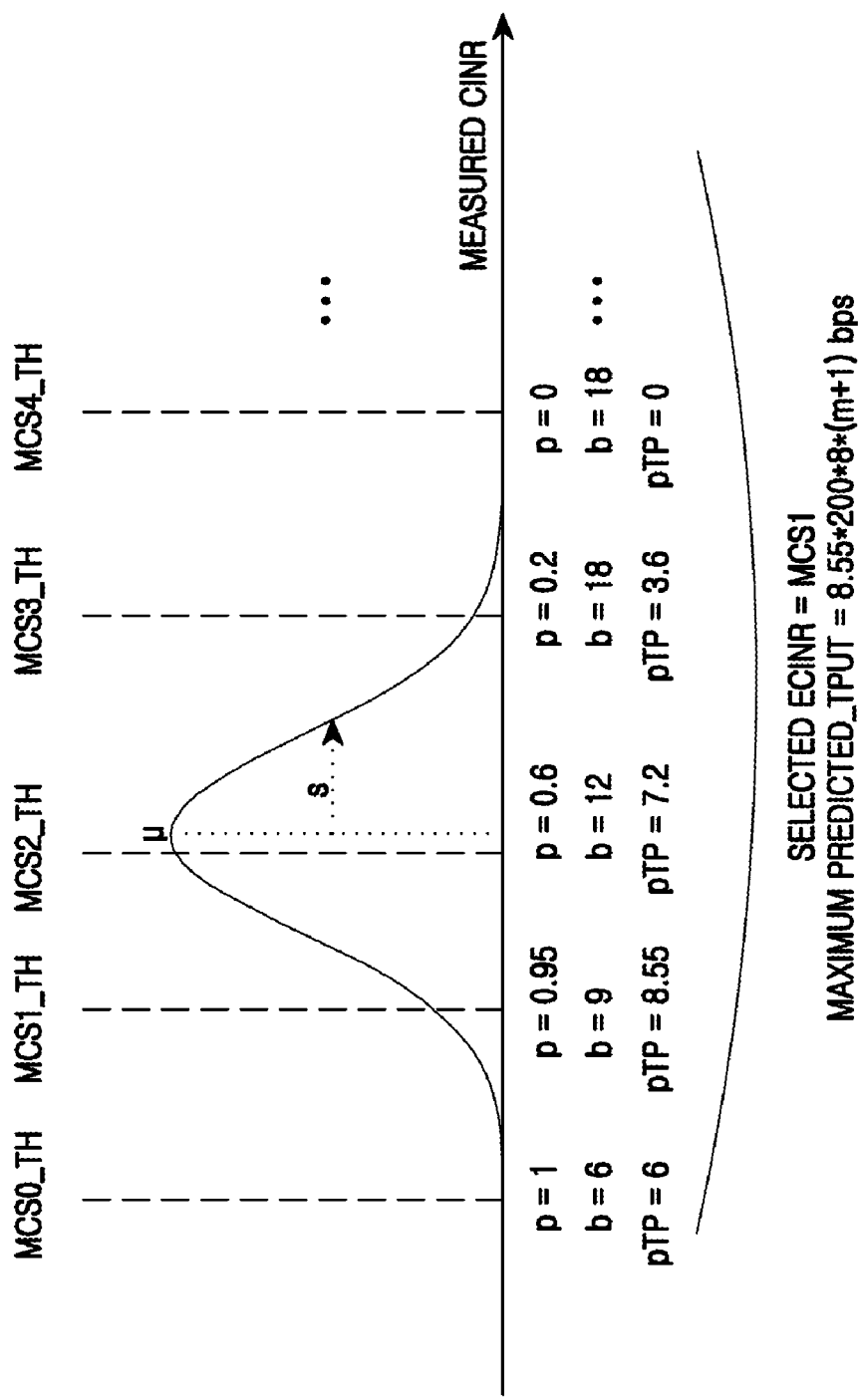
FIG. 4 is a graph illustrating a process of calculating a maximum throughput in a receiver according to an exemplary embodiment of the present invention.

FIG. 4 is a graph illustrating a process of calculating a maximum throughput in a receiver according to an exemplary embodiment of the present invention.

It is assumed in FIG. 4 that a CINR measured for each frame by the receiver 100 is 200 Hz. The measured CINR for each frame is converted in a dB unit. A probable average and dispersion for the instantaneous CINR are predicted. Thereafter, an error value is calculated wherein the error value is a difference between the predicted CINR and the instantaneous CINR measured for each frame. The receiver 100 selects a proper instantaneous CINR as an average value μ of the instantaneous CINR by using the error value.

The error value is selected as a standard deviation s. The graph of FIG. 4 illustrates a Gaussian distribution whose standard deviation is s and average is an instantaneous CINR measured for each frame. In this case, a first MCS_Level (i.e., MCS1) has a maximum throughput. A probability value p proposed in FIG. 4 may be calculated using a standard Gaussian cumulative distribution table.

According to exemplary embodiments of the present invention for selecting an operation mode to improve a throughput of a mobile communication system, an operation mode having a maximum throughput is selected using a standard deviation and an average of an instantaneous CINR. Therefore, channel quality can be more accurately predicted than the conventional mobile communication system for selecting the operation mode by using an average CINR. That is, it is possible to solve a problem in which the operation mode is selected in a state that the average CINR is inaccurately predicted in the conventional mobile communication system.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An apparatus for selecting an operation mode to improve a throughput in a receiver, the apparatus comprising:
   a Carrier to Interference and Noise Ratio (CINR) predictor for predicting a probable average and dispersion for a measured CINR using a preamble of a received pilot signal or radio signal;
   a metric calculator for calculating a throughput for each Modulation and Coding Scheme Level (MCS_Level) by using the probable average and dispersion for the predicted CINR and for selecting an MCS_Level having a maximum throughput; and
   an operation mode selector for selecting an operation mode of the selected MCS_Level having the maximum throughput.

2. The apparatus of claim 1, wherein the operation mode comprises one of a Transmission Diversity (TM) mode and a Spatial Multiplexing (SM) mode.

3. The apparatus of claim 1, wherein the metric calculator calculates the throughput for each MCS_Level by using equation:

$$P_{th} = p \times b \times (c+1),$$

where $P_{th}$ denotes the predicted throughput, p denotes a probability value for the instantaneous CINR (herein, $p = P(r >= r_{threshold})$), b denotes a per-slot transmission amount (byte) of each MCS_Level, c denotes an operation mode of a Multiple Input Multiple Output (MIMO) mode, r denotes the instantaneous CINR, and $r_{threshold}$ denotes a threshold required to calculate a throughput.

4. The apparatus of claim 1, wherein the CINR predictor converts the predicted CINR in a dB unit, obtains an error size by calculating an error value which is a difference between the predicted CINR and the instantaneous CINR measured for each frame, and predicts a probable average and dispersion for the predicted CINR by selecting an instantaneous CINR having a smallest error size as an average value of the instantaneous CINR.

5. The apparatus of claim 1, further comprising a CINR threshold adjustment block for adjusting the threshold required to calculate the throughput by using a Cyclic Redundancy Check (CRC) result of a burst demodulator.

6. The apparatus of claim 5, wherein by using the CRC result of the burst demodulator, if many errors are detected, a selected initial CINR threshold is increased by adding an offset.

7. A method of selecting an operation mode to improve a throughput in a receiver of a mobile communication system, the method comprising:

predicting a probable average and dispersion for an instantaneous Carrier to Interference and Noise Ratio (CINR) measured using a preamble of a received pilot signal or radio signal;

calculating a throughput for each Modulation and Coding Scheme Level (MCS_Level) by using the probable average and dispersion for the predicted CINR;

selecting an MCS_Level having a maximum throughput; and transmitting to a transmitter an operation mode of the selected MCS_Level having the maximum throughput.

8. The method of claim 7, further comprising determining the operation mode before the transmitting of the operation mode to the transmitter.

9. The method of claim 7, wherein the operation mode comprises one of a Transmission Diversity (TM) mode and a Spatial Multiplexing (SM) mode.

10. The method of claim 7, wherein the throughput for each MCS_Level is calculated by using equation:

$P_{th} = p \times b \times (c+1)$ where $P_{th}$ denotes the predicted throughput, p denotes a probability value for the instantaneous CINR (herein, $p=P(r>=r_{threshold})$), b denotes a per-slot transmission amount (byte) of each MCS_Level, c denotes an operation mode of a Multiple Input Multiple Output (MIMO) mode, r denotes the instantaneous CINR, and $r_{threshold}$ denotes a threshold required to calculate a throughput.

11. The method of claim 7, wherein the predicting of the probable average and dispersion for the predicted CINR comprises:

converting the predicted CINR in a dB unit;

calculating an error value which is a difference between the predicted CINR and the instantaneous CINR measured for each frame;

obtaining an error size by using the calculated error value; and selecting an instantaneous CINR having a smallest error size as an average value of the instantaneous CINR.

12. The method of claim 7, further comprising adjusting the threshold required to calculate the throughput by using a Cyclic Redundancy Check (CRC) result of a burst demodulator.

13. The method of claim 12, further comprising, by using the CRC result of the burst demodulator, if many errors are detected, increasing a selected initial CINR threshold by adding an offset.

* * * * *